United States Patent
McDonald et al.

(10) Patent No.: US 7,302,329 B2
(45) Date of Patent: Nov. 27, 2007

(54) APPARATUS, SYSTEM AND METHOD FOR MAGNETORHEOLOGICAL CLUTCH DIAGNOSTICS

(75) Inventors: Mike M. McDonald, Macomb, MI (US); Chandra S. Namuduri, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 405 days.

(21) Appl. No.: 11/106,116

(22) Filed: Apr. 14, 2005

(65) Prior Publication Data
US 2006/0245929 A1 Nov. 2, 2006

(51) Int. Cl.
*B62D 6/00* (2006.01)
(52) U.S. Cl. .......................... 701/43; 701/41
(58) Field of Classification Search ............ 701/41, 701/42, 43; 180/406, 421, 405, 466; 417/321, 417/323
See application file for complete search history.

(56) References Cited

U.S. PATENT DOCUMENTS

| | | | |
|---|---|---|---|
| 5,619,957 A | 4/1997 | Michels | 123/41.44 |
| 7,051,834 B2* | 5/2006 | Fujita | 180/446 |
| 7,143,862 B2* | 12/2006 | Knoff et al. | 180/406 |
| 7,163,080 B2* | 1/2007 | Fardoun et al. | 180/446 |
| 2004/0194459 A1 | 10/2004 | Namuduri | 60/435 |

\* cited by examiner

*Primary Examiner*—Richard M. Camby

(57) ABSTRACT

An apparatus and method for monitoring and diagnosing the coil temperature of a magnetorheological (MR) clutch connected to a power steering pump of a vehicle is disclosed. The apparatus includes a processing circuit, and a storage medium, readable by the processing circuit, for storing instructions for execution by the processing circuit for receiving a plurality of input signals representative of dynamic operating conditions relating to the vehicle, using the input signals to generate an output signal representative of a temperature of the coil of the MR clutch, determining from the output signal whether the temperature of the coil exceeds a threshold limit, and in response to the temperature of the coil exceeding a threshold limit, triggering at least one of a remedial action and a data storage algorithm.

14 Claims, 8 Drawing Sheets

| OUTPUT SIGNAL | | | | | |
|---|---|---|---|---|---|
| | PWM DUTY CYCLE | | | | |
| CURRENT READING | 0.20 | 0.35 | 0.50 | 0.65 | 0.80 |
| 1.0 | 310 | | | | |
| 1.5 | 120 | | | | |
| 2.0 | 27 | 302 | | | |
| 2.5 | −29 | 190 | | | |
| 3.0 | | 115 | 296 | | |
| 3.5 | | 63 | 216 | 367 | |
| 4.0 | | 23 | 156 | 291 | |
| 4.5 | | −8 | 110 | 229 | 349 |
| 5.0 | | −34 | 72 | 179 | 286 |
| 5.5 | | −52 | 41 | 138 | 235 |
| 6.0 | | −71 | 16 | 104 | 192 |
| 6.5 | | | −5 | 75 | 156 |
| 7.0 | | | −25 | 50 | 124 |
| 7.5 | | | −40 | 32 | 98 |
| 8.0 | | | −54 | 15 | 75 |
| 8.5 | | | | −1 | 54 |
| 9.0 | | | | −18 | 36 |
| 9.5 | | | | −35 | 20 |
| 10.0 | | | | −45 | 4 |
| 10.5 | | | | −55 | −8 |
| 11.0 | | | | −65 | −20 |
| 11.5 | | | | −75 | −32 |
| 12.0 | | | | | −42 |
| 12.5 | | | | | −51 |
| 13.0 | | | | | −60 |
| 13.5 | | | | | −68 |
| 14.0 | | | | | |
| 14.5 | | | | | |
| 15.0 | | | | | |

SUPPLY VOLTAGE READING = 11.0 VOLTS

*Fig. 5A*

| OUTPUT SIGNAL | | | | | |
|---|---|---|---|---|---|
| | PWM DUTY CYCLE | | | | |
| CURRENT READING | 0.20 | 0.35 | 0.50 | 0.65 | 0.80 |
| 1.0 | | | | | |
| 1.5 | 210 | | | | |
| 2.0 | 94 | | | | |
| 2.5 | 26 | 283 | | | |
| 3.0 | −20 | 193 | | | |
| 3.5 | −52 | 128 | 311 | | |
| 4.0 | | 80 | 239 | | |
| 4.5 | | 43 | 184 | 324 | |
| 5.0 | | 13 | 139 | 265 | |
| 5.5 | | −11 | 102 | 216 | 331 |
| 6.0 | | −32 | 72 | 176 | 280 |
| 6.5 | | −48 | 45 | 141 | 238 |
| 7.0 | | −63 | 24 | 112 | 201 |
| 7.5 | | | 4 | 85 | 169 |
| 8.0 | | | −12 | 64 | 141 |
| 8.5 | | | −27 | 44 | 116 |
| 9.0 | | | −40 | 27 | 95 |
| 9.5 | | | −50 | 11 | 75 |
| 10.0 | | | −60 | −2 | 58 |
| 10.5 | | | −71 | −14 | 42 |
| 11.0 | | | | −26 | 28 |
| 11.5 | | | | −37 | 14 |
| 12.0 | | | | −45 | 2 |
| 12.5 | | | | −54 | −8 |
| 13.0 | | | | −63 | −19 |
| 13.5 | | | | −71 | −29 |
| 14.0 | | | | | −38 |
| 14.5 | | | | | −46 |
| 15.0 | | | | | −53 |

SUPPLY VOLTAGE READING = 13.0 VOLTS

*Fig. 5B*

| OUTPUT SIGNAL | | | | | |
|---|---|---|---|---|---|
| | PWM DUTY CYCLE | | | | |
| CURRENT READING | 0.20 | 0.35 | 0.50 | 0.65 | 0.80 |
| 1.0 | | | | | |
| 1.5 | 298 | | | | |
| 2.0 | 160 | | | | |
| 2.5 | 78 | 367 | | | |
| 3.0 | 24 | 270 | | | |
| 3.5 | −14 | 195 | | | |
| 4.0 | −43 | 139 | 322 | | |
| 4.5 | −66 | 95 | 257 | | |
| 5.0 | | 60 | 204 | 352 | |
| 5.5 | | 31 | 162 | 295 | |
| 6.0 | | 6 | 126 | 247 | 366 |
| 6.5 | | −13 | 96 | 207 | 319 |
| 7.0 | | −31 | 71 | 173 | 277 |
| 7.5 | | −45 | 48 | 144 | 240 |
| 8.0 | | −58 | 29 | 118 | 207 |
| 8.5 | | −71 | 12 | 95 | 179 |
| 9.0 | | | −3 | 75 | 154 |
| 9.5 | | | −16 | 57 | 131 |
| 10.0 | | | −29 | 40 | 111 |
| 10.5 | | | −40 | 27 | 93 |
| 11.0 | | | −49 | 13 | 76 |
| 11.5 | | | −57 | 1 | 61 |
| 12.0 | | | −66 | −9 | 46 |
| 12.5 | | | | −20 | 34 |
| 13.0 | | | | −30 | 22 |
| 13.5 | | | | −39 | 10 |
| 14.0 | | | | −46 | 0 |
| 14.5 | | | | −54 | −9 |
| 15.0 | | | | −61 | −18 |

SUPPLY VOLTAGE READING = 15.0 VOLTS

*Fig. 5C*

| OUTPUT SIGNAL | | | | | |
|---|---|---|---|---|---|
| | PWM DUTY CYCLE | | | | |
| CURRENT READING | 0.20 | 0.35 | 0.50 | 0.65 | 0.80 |
| 1.0 | | | | | |
| 1.5 | | | | | |
| 2.0 | 227 | | | | |
| 2.5 | 131 | | | | |
| 3.0 | 68 | 348 | | | |
| 3.5 | 23 | 261 | | | |
| 4.0 | −10 | 196 | | | |
| 4.5 | −38 | 146 | 330 | | |
| 5.0 | −57 | 106 | 271 | | |
| 5.5 | −76 | 73 | 222 | | |
| 6.0 | | 44 | 182 | 319 | |
| 6.5 | | 22 | 147 | 274 | |
| 7.0 | | 2 | 117 | 235 | 353 |
| 7.5 | | −14 | 92 | 201 | 311 |
| 8.0 | | −30 | 70 | 171 | 274 |
| 8.5 | | −42 | 50 | 146 | 241 |
| 9.0 | | −53 | 34 | 122 | 212 |
| 9.5 | | −64 | 18 | 102 | 187 |
| 10.0 | | −76 | 3 | 83 | 163 |
| 10.5 | | | −8 | 68 | 143 |
| 11.0 | | | −18 | 53 | 124 |
| 11.5 | | | −29 | 39 | 107 |
| 12.0 | | | −39 | 27 | 91 |
| 12.5 | | | −47 | 14 | 76 |
| 13.0 | | | −55 | 3 | 63 |
| 13.5 | | | −63 | −6 | 50 |
| 14.0 | | | | −16 | 38 |
| 14.5 | | | | −25 | 28 |
| 15.0 | | | | −33 | 17 |

SUPPLY VOLTAGE READING = 17.0 VOLTS

APPARATUS, SYSTEM AND METHOD FOR MAGNETORHEOLOGICAL CLUTCH DIAGNOSTICS

BACKGROUND OF THE INVENTION

The present disclosure relates generally to an apparatus, system and method for magnetorheological clutch diagnostics, and particularly to a controller for monitoring and diagnosing the coil temperature of a magnetorheological (MR) clutch connected to a power steering pump of a vehicle.

Power steering systems are used in vehicles such as motor vehicles to assist a driver in steering the vehicle. In power steering systems of a hydraulic type, an engine driven hydraulic power steering pump is used for generating pressurized fluid that is coupled to a hydraulic steering gear of the vehicle. Since the traditional power steering pump is driven directly by the engine, the engine-determines the speed of the pump, and the pump operates continuously as long as the engine is running, resulting in continuous losses due to constant circulation of the hydraulic fluid through the steering gear. Also, the pump needs to provide the required flow and pressure for the worst case engine speed, which could be near idle or under static steering conditions, which contributes to additional losses due to under-utilized pump energy, and at higher engine speeds a much higher pump flow results, which contributes to further losses due to the use of an overpowered pump.

In an effort to address these losses and provide for more efficiency in the operation of the vehicle, a MR clutch coupled to a hydraulic power steering pump has been considered, which would provide for different pump operating conditions as a function of the vehicle dynamics. However, to provide for a durable and reliable powering steering system utilizing a MR clutch, it is desirable to monitor and diagnose operating conditions at the MR clutch, such as the temperature of the MR clutch coil for example. Accordingly, there is a need in the art for an apparatus and method for monitoring and diagnosing the coil temperature of a MR clutch coupled to a hydraulic power steering pump.

BRIEF DESCRIPTION OF THE INVENTION

An embodiment of the invention includes a controller for monitoring and diagnosing the coil temperature of a magnetorheological (MR) clutch connected to a power steering pump of a vehicle. The controller includes a processing circuit, and a storage medium, readable by the processing circuit, for storing instructions for execution by the processing circuit for receiving a plurality of input signals representative of dynamic operating conditions relating to the vehicle, using the input signals to generate an output signal representative of a temperature of the coil of the MR clutch, determining from the output signal whether the temperature of the coil exceeds a threshold limit, and in response to the temperature of the coil exceeding a threshold limit, triggering at least one of a remedial action and a data storage algorithm.

Another embodiment of the invention includes, a magnetorheological (MR) power steering pump system for a vehicle. The system includes a MR clutch having an excitation coil, a power steering pump in operable communication with the MR clutch, and a controller in operable communication with the MR clutch. The controller includes a processing circuit, and a storage medium, readable by the processing circuit, for storing instructions for execution by the processing circuit for receiving a plurality of input signals representative of dynamic operating conditions relating to the vehicle, using the input signals to generate an output signal representative of a temperature of the coil of the MR clutch, determining from the output signal whether the temperature of the coil exceeds a threshold limit, and in response to the temperature of the coil exceeding a threshold limit, triggering at least one of a remedial action and a data storage algorithm.

A further embodiment of the invention includes a method for monitoring and diagnosing the coil temperature of a magnetorheological (MR) clutch connected to a power steering pump of a vehicle. A plurality of input signals representative of dynamic operating conditions relating to the vehicle are received and used to generate an output signal representative of a temperature of the coil of the MR clutch. From the output signal it is determined whether the temperature of the coil exceeds a threshold limit, and in response to the temperature of the coil exceeding a threshold limit, at least one of a remedial action and a data storage algorithm is triggered.

Yet a further embodiment of the invention includes a method for calibrating a look-up table (LUT) used for monitoring and diagnosing the coil temperature of a magnetorheological (MR) clutch connected to a power steering pump of a vehicle. A first signal representative of a supply voltage of the vehicle is received, a second signal representative of a duty cycle of the MR clutch coil is received, a third signal representative of a current through the MR clutch coil is received, and a fourth signal representative of a sensed temperature of the MR clutch coil is received. By relating information associated with the fourth signal to information associated with the first, second and third signals, a multi-dimensional look-up table is populated.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a controller for monitoring and diagnosing the coil temperature of a magnetorheological (MR) clutch connected to a power steering pump of a vehicle. The controller receives input signals relating to a supply voltage of the vehicle, a duty cycle of the MR clutch coil, and a current through the MR clutch coil, and produces an output signal representative of a temperature of the coil of the MR clutch. In the event of an over-temperature condition, the controller may trigger remedial action and/or a data storage algorithm. A look-up table serves to determine whether the temperature of the coil exceeds a threshold limit, thereby providing coil monitoring and diagnostics in the absence of a need for a physical temperature sensor at the windings of the coil.

Figure 1:
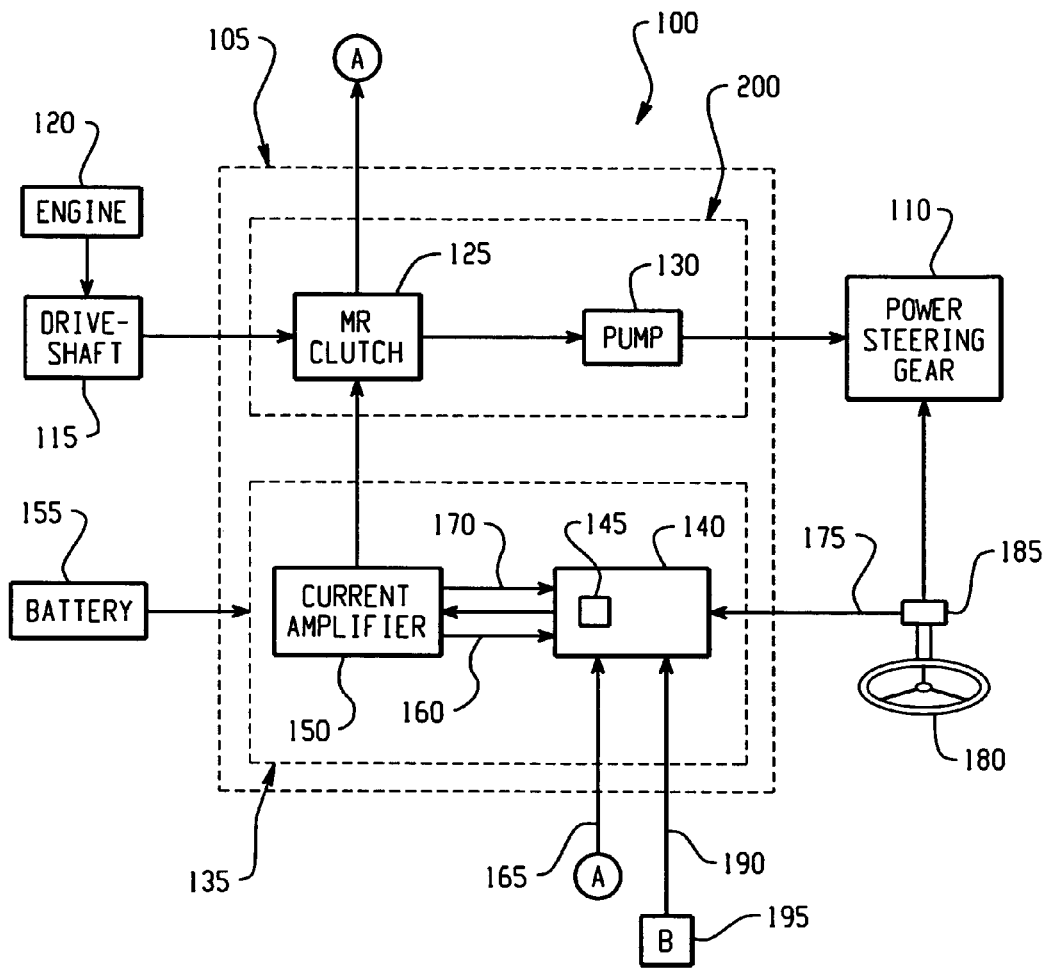
FIG. 1 depicts a block diagram representation of an exemplary embodiment of magnetorheological (MR) power steering drive system in accordance with an embodiment of the invention.

FIG. 1 is a block diagram representation of an exemplary embodiment of magnetorheological (MR) power steering drive system (PSDS) 100 having a MR power steering pump system (PSPS) 105 operatively connected to a power steering gear 110 and a drive-shaft 115 such as an auxiliary drive-shaft of an engine 120. MR-PSPS 105 includes a MR clutch 125 in operable communication with a power steering pump 130, and an electronic controller 135 in operable communication with the MR clutch 125. In alternative embodiments, MR clutch 125 and power steering pump 130 may be an integral unit 200, or may be separate units. Controller 135 includes a processing circuit 140 with a storage medium 145 for storing processing instructions, and a current amplifier 150. In alternative embodiments, processing circuit 140 and current amplifier 150 may be an integral unit or may be separate units. Controller 135 receives power from a power source such as a vehicle battery 155 for example, and processing circuit 140 receives a plurality of signals 160, 165, 170 representative of dynamic operating conditions relating to the vehicle (not shown). Exemplary dynamic operating conditions relating to the vehicle include, but are not limited to: a voltage signal 160 representative of a supply voltage, such as from the battery 155; a duty cycle signal 165 representative of the duty cycle of the MR clutch coil, which typically is a pulse width modulated (PWM) signal and may be supplied by another control system (not shown) of the vehicle or by a feedback loop (generally depicted by "A") from an MR clutch coil 230 (discussed later with reference to FIG. 2) within MR clutch 125; and, a feedback signal 170 from current amplifier 150 that is representative of the current through the MR clutch coil 230 within MR clutch 125. Other input signals that may be received by processing circuit 140 include a signal 175 representative of the angle of steering wheel 180 from steering wheel sensor 185, and other signals 190 from other vehicle sensors and/or vehicle controllers representative of such parameters as vehicle speed, wheel speed, yaw rate, lateral acceleration, side slip angle, road surface condition or type, and/or other vehicle dynamic-related data, represented generally by "B" 195.

Figure 2:
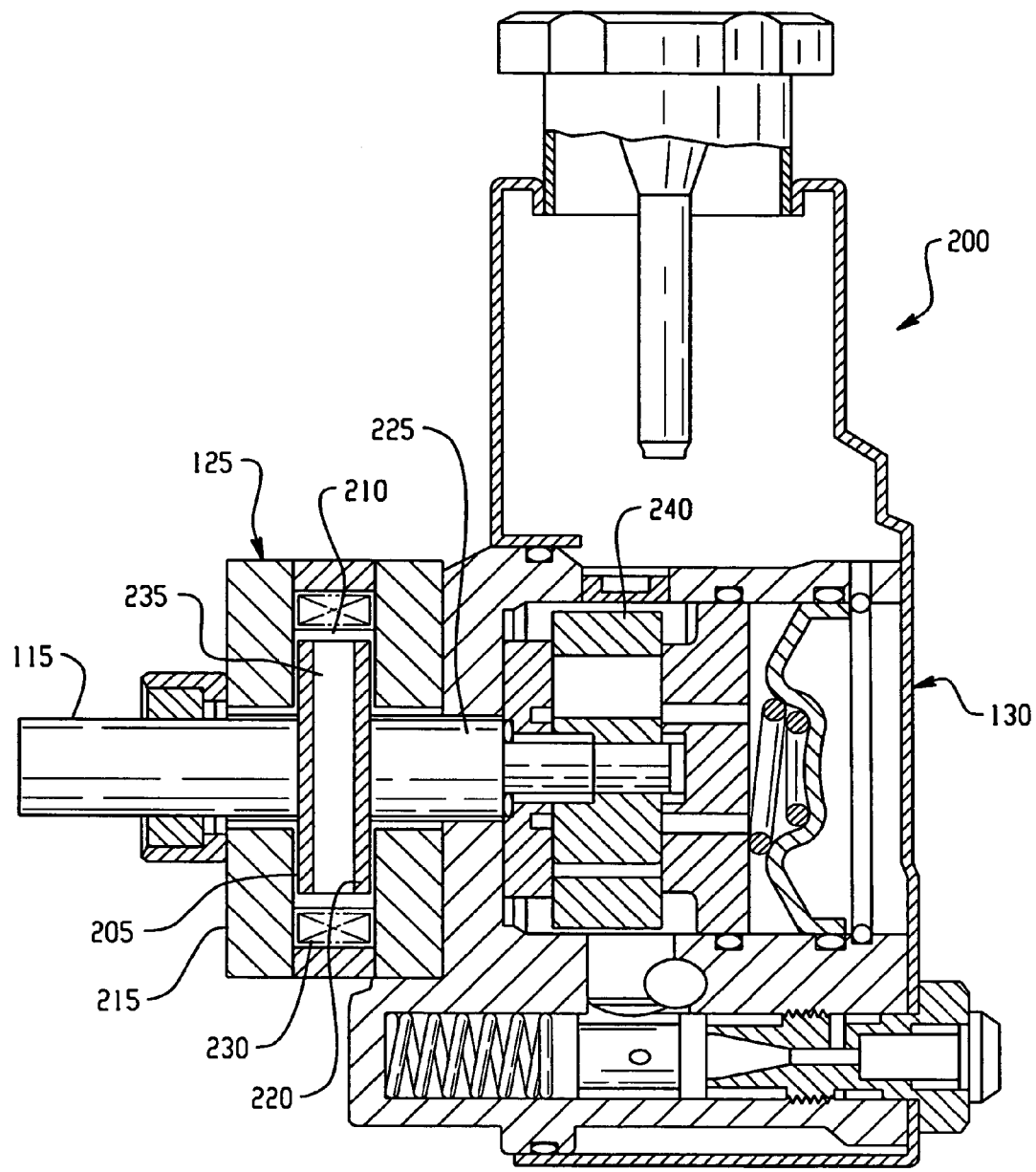
FIG. 2 depicts an exemplary integral arrangement of an exemplary MR clutch and an exemplary hydraulic power steering pump for use in accordance with an embodiment of the invention.

FIG. 2 depicts an integral arrangement 200 of an exemplary MR clutch 125 and a hydraulic power steering pump 130. In an embodiment, the hydraulic power steering pump 130 is of a type known in the art. In an embodiment, the MR clutch 125 includes a drive member 205 disposed within a cavity 210 of a housing 215. In an embodiment, the drive member 205 is generally circular in shape, is made of a ferrous material, and is fixed to the drive-shaft 115 by any suitable means. A driven member 220 is also disposed within the cavity 210. The driven member 220 is also generally circular in shape, is made of ferrous material, and is fixed to an intermediate shaft 225 by any suitable means. The intermediate shaft 225 is operably connected to the power steering pump 130 by known means. MR clutch 125 also includes an excitation coil 230 disposed within the cavity 210 and about the drive member 205 and the driven member 220. The coil 230 is spaced a predetermined distance from the drive member 205 and the driven member 220, and is connected by suitable means such as wires to the current amplifier 150. Disposed within the cavity 210 is a MR fluid 235 between the drive member 205 and the driven member 220. In an embodiment, MR fluid 235 contains magnetizable particles such as carbonyl iron spheroids of about one to ten microns in diameter dispersed in a viscous fluid such as synthetic hydrocarbon oil that has a viscosity between about 10 and 10,000 cP (centi-Poise). However, it will be appreciated that MR fluid 235 may be of a type known in the art and may also contain surfactants, flow modifiers, lubricants, viscosity enhancers, and/or other additives.

In operation of MR-PSDS 100, controller 135 adjusts the current of the coil 230 of MR clutch 125 based on a control algorithm, which is programmed into the memory 145 of processing circuit 140. The control algorithm for adjusting the current to the coil 230 of MR clutch 125 utilizes all or some of the information from signals 160, 165, 170, 175. In response to the control algorithm, controller 135 sends a signal to MR clutch 125 through the current amplifier 150 to pass a control current through the coil 230 to generate a magnetic field across the MR fluid 235 between the drive member 205 and the driven member 220. The strength of the magnetic field increases or decreases the apparent viscosity of the MR fluid 235 and thus increases or decreases the speed of the hydraulic power steering pump 130. The apparent viscosity of the MR fluid 235 determines the amount of rotation of the intermediate shaft 225 and a vane pump member 240 of pump 130, thus varying the speed of operation of the pump 130. It will be appreciated that the amount of current passed through the coil 230 is programmable by the electronic controller 135, thus affecting the strength of the magnetic field within and viscosity of the MR fluid 235. While a single gap, parallel plate type MR fluid clutch 125 is depicted in FIG. 2, it will be appreciated that the scope of the invention is not so limited, and that other configurations such as multiple plate, multiple gap, or cylindrical type MR fluid clutches may also be used.

Figure 3:
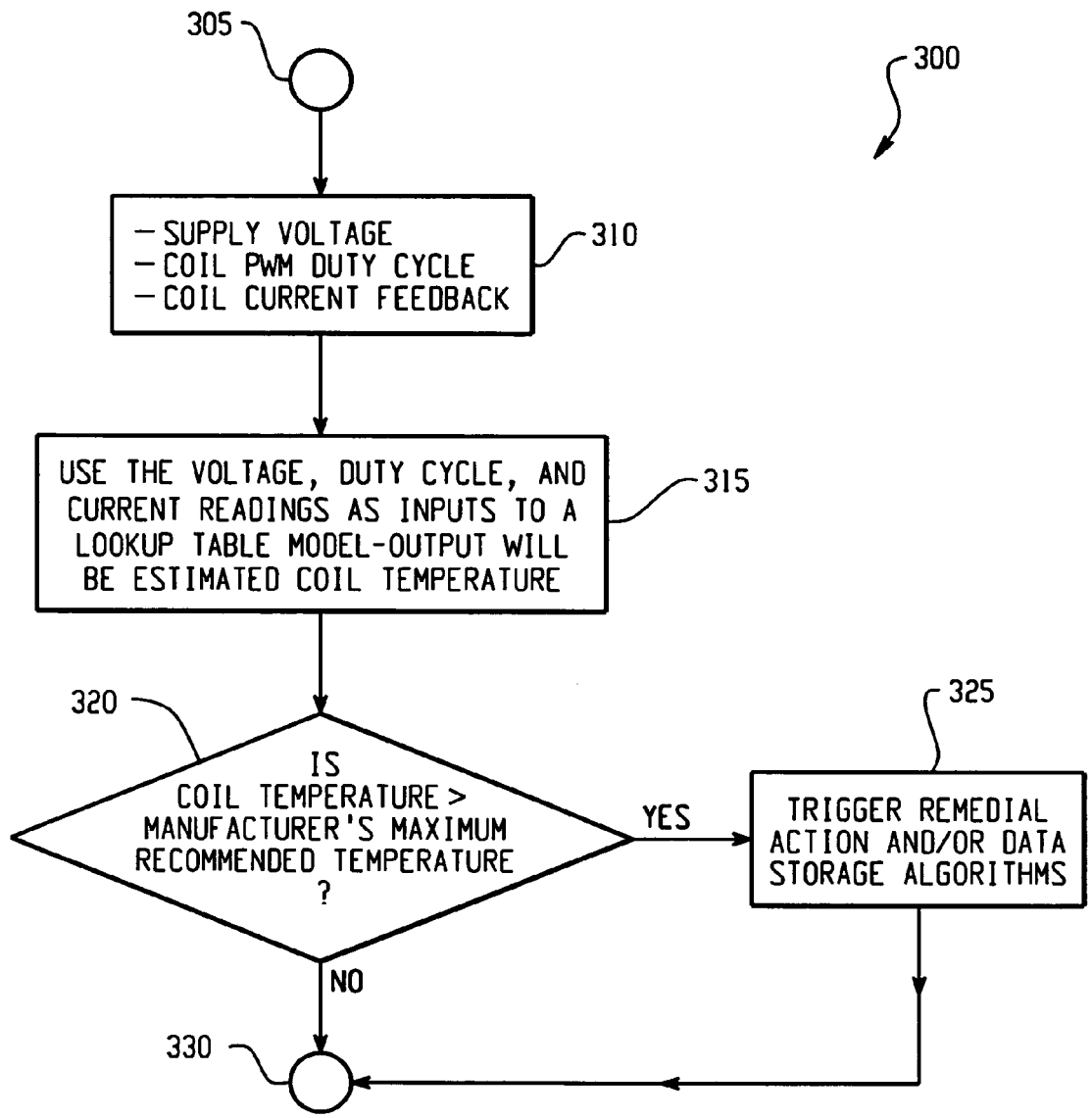
FIG. 3 depicts an exemplary flowchart of a diagnostics algorithm in accordance with an embodiment of the invention.

In operation of the MR clutch 125, it is desirable to monitor and diagnose the temperature of the coil 230 so as to avoid an overtemperature condition at the coil 230. The monitoring and diagnosing may be accomplished by the use of a diagnostics algorithm that is processed at processing circuit 140. With reference now to FIG. 3, processing circuit 140 is programmed to read instructions stored at memory 145 for carrying out the method (algorithm) 300 for monitoring and diagnosing the coil temperature of MR clutch 125 that is connected to a power steering pump 130 of a vehicle.

At block 305, the programmed logic run by processing circuit 140 enters the diagnostics algorithm under steady state operating conditions. At block 310, a plurality of input signals representative of dynamic operating conditions relating to the vehicle are received at processing circuit 140, the signals including a first signal 160 representative of a supply voltage of the vehicle, a second signal 165 representative of a duty cycle of the MR clutch coil, and a third signal 170 representative of a current through the MR clutch coil. In an embodiment, the second signal 165 is a pulse width modulated (PWM) signal. At block 315, processing circuit 140 uses the input signals 160, 165, 170 to generate an output signal representative of a temperature of the coil 230 of the MR clutch 125. In an embodiment, the logic of algorithm 300 enters a three-dimensional look-up table (discussed later with reference to FIGS. 5A, B, C and D) that has been calibrated and populated with data that relates the actual operating temperature of coil 230 to the operating parameters represented by signals 160, 165, 170. The output signal of the look-up table is representative of a virtual or estimated temperature of coil 230. The calibration of the look-up table is discussed in more detail later with reference to FIG. 4.

At block 320, it is determined from the output signal of the look-up table whether the temperature of the coil 230 exceeds a threshold limit, such as a manufacturer's recommended maximum operating temperature. At block 325, and in response to the temperature of the coil 230 exceeding a threshold limit, processing circuit 140 triggers a remedial action such as the activation of a check engine light, and/or a data storage algorithm such as the setting of an error code or the saving of controller history data.

At block 330, control logic passes back to controller 135, which may repeat the method 300 indefinitely or until reset, or await further instructions from a higher level controller (not shown) within the vehicle.

By utilizing a look-up table, the temperature of coil 230 may be estimated absent the need for a physical temperature sensor at the coil 230, thereby providing a virtual sensor and reducing system complexity and cost.

While embodiments of the invention have been described using a look-up table for providing, as function of three defined input signals, an output signal representative of a temperature at the coil 230 of MR clutch 125, it will be appreciated that the look-up table may be replaced by any equivalent means for defining an output as a function of an input, such as an equation or a transfer function for example.

Figure 4:
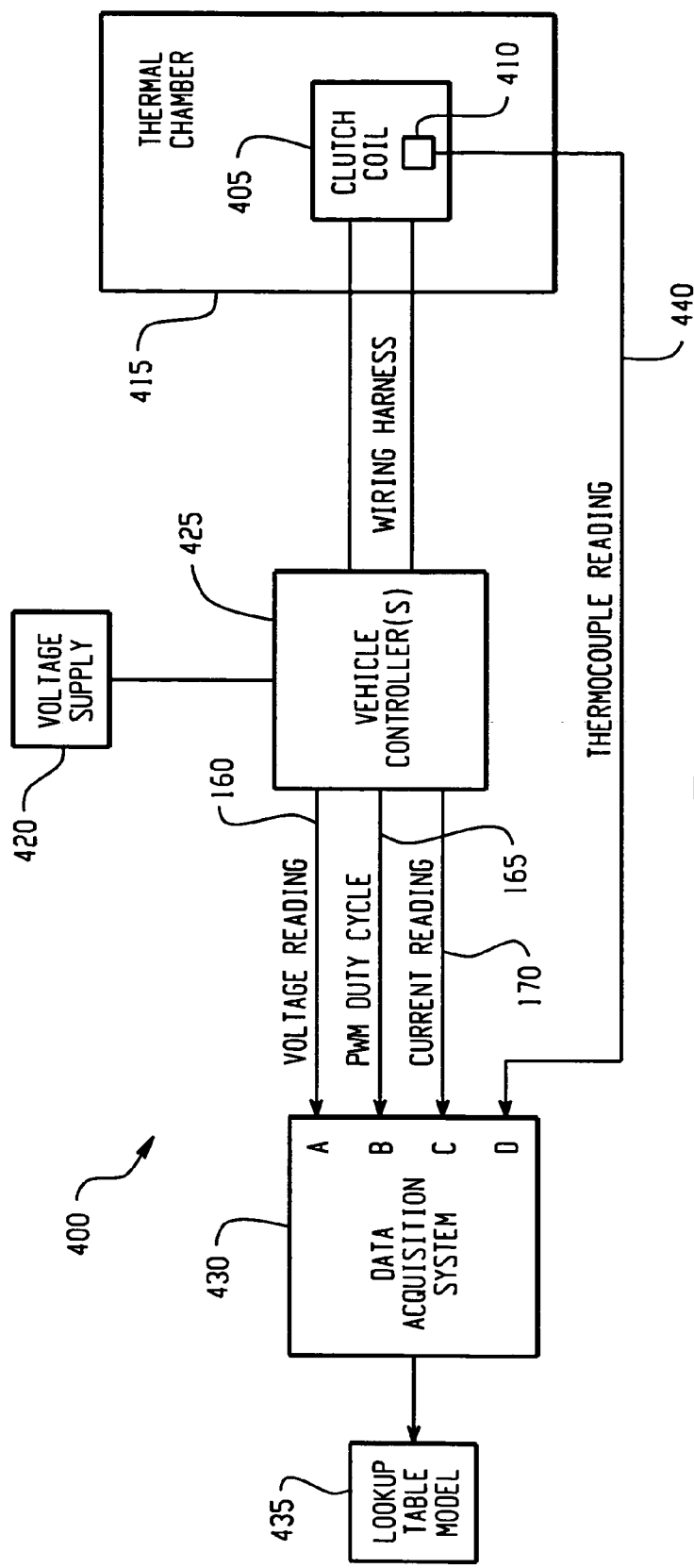
FIG. 4 depicts an exemplary block diagram representation of a method for calibrating a look-up table in accordance with an embodiment of the invention, and FIGS. 5A, B, C and D depict an exemplary look-up table in accordance with an embodiment of the invention.

Referring now to FIG. 4, a method 400 for calibrating the aforementioned look-up table used for monitoring and diagnosing the coil temperature of MR clutch 125 connected to power steering pump 130, the look-up table being utilized in method 300, will now be discussed.

Block 405 represents an actual MR clutch coil 230, mounted inside a hydraulic steering pump 130, with a physical temperature sensor 410 such as a thermocouple embedded at the windings of the coil 230. Block 415 represents a laboratory thermal chamber in which coil 230 is placed. Thermal chamber 415 is designed to simulate the ambient temperatures that clutch housing 215 is likely to see during actual in-vehicle usage. An alternative to using a thermal chamber 415 would be to install a thermocouple-instrumented MR clutch 125 into an actual development test vehicle (not shown). However, such a test vehicle should be designed to test all of temperatures that clutch housing 215 is likely to see during actual in-vehicle usage.

Block 420 is a laboratory voltage supply designed to simulate all of the voltage ranges that controller 135 is likely to see during actual in-vehicle usage. As indicated earlier, if a test vehicle is employed, the test vehicle's voltage regulation control system should be designed and adjusted to obtain all of the voltage levels that controller 135 is likely to see during actual in-vehicle usage.

Block 425 is representative of vehicle controller 135, including the circuits and software, used for the control of the MR clutch 125. The output of block 425 includes the first signal 160 representative of a supply voltage of the vehicle, the second signal 165 representative of a duty cycle of the MR clutch coil, and the third signal 170 representative of a current through the MR clutch coil. Since actual in-vehicle usage may result in control signals 160, 165, 170 coming from more than one controller 135, the signals from block 425 should be representative of the signal variations possible from all such controllers.

Block 430 represents a laboratory data acquisition system (DAS) used to process and record the data associated with the look-up table model depicted at block 435. The contents of look-up table 435 are discussed later with reference to FIGS. 5A, B, C and D. The DAS 430 records the steady state values for the following signals: supply voltage (160), coil PWM duty cycle (165), coil current (170), and coil temperature (thermocouple reading) 440. The DAS 430 populates the multi-dimensional look-up table 435 by relating information associated with the fourth signal (440) to information associated with the first (160), second (165) and third (170) signals, thereby resulting in a three-dimensional look-up table 435 that includes information relating to substantially all operating conditions likely to be experienced by an MR clutch coil 230 in an actual vehicle during actual in-vehicle usage.

FIGS. 5A, B, C and D illustrate the contents of an exemplary look-up table 435 having four voltage level readings 160: 11 Volts (V), 13V, 15V and 17V. For each voltage level reading 160, a plurality of PWM duty cycle readings 165 and current readings 170 in Amperes are presented. The output of the look-up table 435 is a signal having the designated value that is representative of the estimated coil temperature in degree Celsius. Blank cells of the look-up table 435 represent operating points that are far enough outside the normal operating regions of the system that they are not considered suitable for describing the behavior of the actual physical system.

The look-up table 435 is programmed into the controller's memory 145, and is used to describe the relationship between the three input signals 160, 165, 170 and the one output signal (estimated coil temperature), that is:

(estimated coil temp.)=$f$(system voltage reading, coil electrical current reading, commanded duty cycle).

The exemplary look-up table 435 contains samples of the input signals at pre-defined interval points. The samples of the input signals are then mapped to the output signal for every combination of input points. If the set of signal inputs do not exactly match the look-up table's input signal interval points, the processing circuit 140 will interpolate and/or extrapolate between the various input signals to get an output signal. The description of the interpolation/extrapolation techniques are not herein presented as they are considered to be techniques that are well know to those skilled in the art.

While FIGS. 5A, B, C and D illustrate a look-up table 435 having one level of granularity for each of the three input signals 160, 165, 170, it will be appreciated that this is for illustration purposes only, that the scope of the invention is not so limited, and that other degrees of granularity may be employed. An embodiment of the invention may be embodied in the form of computer-implemented processes and apparatuses for practicing those processes.

The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to monitor and diagnose the coil temperature of a magnetorheological (MR) clutch connected to a power steering pump of a vehicle, thereby enabling the triggering of remedial action and/or data storage algorithms in the event of an over-temperature condition at the coil.

As disclosed, some embodiments of the invention may include some of the following advantages: a method and system for monitoring and diagnosing the coil temperature of a MR clutch using input signal variables that take into account the coil resistance varying as a function of temperature, the coil inductance varying as function of temperature, eddy current effects in the coil's magnetic circuit varying as a function of coil current, the driver circuitry of the controller having non-linear resistance characteristics, and the non-linear signal characteristics associated with the vehicle operating dynamics, thereby providing a virtual sensor that accounts for variations and non-linearities in the system; a method and system for monitoring and diagnosing the coil temperature of a MR clutch absent the need for a physical temperature sensor at the clutch coil; the ability to monitor and protect the coil in a MR power steering clutch from overheating; the ability to implement non-obtrusive diagnostics that does not require additional hardware, such as a thermocouple; the ability to trigger remedial action in the event of an overtemperature condition at the MR clutch coil, or to trigger storage of control history for subsequent use during vehicle maintenance; and, the ability to utilize the estimated temperature signal for a feed-forward control algorithm for enhanced control of the clutch current.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A controller for monitoring and diagnosing the coil temperature of a magnetorheological (MR) clutch connected to a power steering pump of a vehicle, the controller comprising:
   a processing circuit; and
   a storage medium, readable by the processing circuit, for storing instructions for execution by the processing circuit for:
   receiving a plurality of input signals representative of dynamic operating conditions relating to the vehicle;
   using the input signals to generate an output signal representative of a temperature of the coil of the MR clutch;
   determining from the output signal whether the temperature of the coil exceeds a threshold limit; and
   in response to the temperature of the coil exceeding a threshold limit, triggering at least one of a remedial action and a data storage algorithm.

2. The controller of claim 1, wherein:
   the output signal is representative of an estimated temperature of the MR clutch coil absent a need for a physical temperature sensor at the coil.

3. The controller of claim 1, wherein the plurality of input signals comprises:
   a first signal representative of a supply voltage of the vehicle;
   a second signal representative of a duty cycle of the MR clutch coil; and
   a third signal representative of a current through the MR clutch coil.

4. The controller of claim 1, further comprising a storage medium, readable by the processing circuit, for storing instructions for execution by the processing circuit for:
   using a look-up table, an equation, a transfer function, or any combination comprising at least one of the foregoing, for determining whether the temperature of the coil exceeds a threshold limit.

5. The controller of claim 1, further comprising a storage medium, readable by the processing circuit, for storing instructions for execution by the processing circuit for:
   using a three-dimensional look-up table for estimating the temperature of the coil; and
   using the estimated temperature to determine whether the temperature of the coil exceeds a threshold limit.

6. The controller of claim 1, further comprising:
   a storage medium, readable by the processing circuit, for storing instructions for execution by the processing circuit for generating a control signal; and
   a current amplifier responsive to the control signal and in signal communication with the MR clutch coil.

7. A magnetorheological (MR) power steering pump system for a vehicle, the system comprising:
   a MR clutch having an excitation coil;
   a power steering pump in operable communication with the MR clutch; and
   a controller in operable communication with the MR clutch, the controller comprising:
   a processing circuit; and
   a storage medium, readable by the processing circuit, for storing instructions for execution by the processing circuit for:
   receiving a plurality of input signals representative of dynamic operating conditions relating to the vehicle;
   using the input signals to generate an output signal representative of a temperature of the coil of the MR clutch;
   determining from the output signal whether the temperature of the coil exceeds a threshold limit; and
   in response to the temperature of the coil exceeding a threshold limit, triggering a remedial action, a data storage algorithm, or both.

8. The system of claim 7, wherein:
   the output signal is representative of an estimated temperature of the MR clutch coil absent a need for a physical temperature sensor at the coil;
   the plurality of input signals comprises a first signal representative of a supply voltage of the vehicle, a second signal representative of a duty cycle of the MR clutch coil, and a third signal representative of a current through the MR clutch coil; and
   further comprising a storage medium, readable by the processing circuit, for storing instructions for execution by the processing circuit for:
   using a look-up table, an equation, a transfer function, or any combination comprising at least one of the foregoing, for estimating the temperature of the coil then determining whether the estimated coil temperature exceeds a threshold limit.

9. A method for monitoring and diagnosing the coil temperature of a magnetorheological (MR) clutch connected to a power steering pump of a vehicle, the method comprising:

receiving a plurality of input signals representative of dynamic operating conditions relating to the vehicle;

using the input signals to generate an output signal representative of a temperature of the coil of the MR clutch;

determining from the output signal whether the temperature of the coil exceeds a threshold limit; and in response to the temperature of the coil exceeding a threshold limit, triggering a remedial action, a data storage algorithm, or both.

10. The method of claim 9, wherein:

the output signal is representative of an estimated temperature of the MR clutch coil absent a need for a physical temperature sensor at the coil;

the plurality of input signals comprises a first signal representative of a supply voltage of the vehicle, a second signal representative of a duty cycle of the MR clutch coil, and a third signal representative of a current through the MR clutch coil; and further comprising:

using a look-up table, an equation, a transfer function, or any combination comprising at least one of the foregoing, to estimate the temperature of the coil; and using a diagnostic algorithm to decide if the estimated coil temperature exceeds a threshold value.

11. A method for calibrating a look-up table used for monitoring and diagnosing the coil temperature of a magnetorheological (MR) clutch connected to a power steering pump of a vehicle, the method comprising:

receiving a first signal representative of a supply voltage of the vehicle;

receiving a second signal representative of a duty cycle of the MR clutch coil;

receiving a third signal representative of a current through the MR clutch coil;

receiving a fourth signal representative of a sensed temperature of the MR clutch coil; and populating a multi-dimensional look-up table by relating information associated with the fourth signal to information associated with the first, second and third signals.

12. The method of claim 11, wherein the first, second, third and fourth, signals are steady state signals.

13. The method of claim 11, further comprising:

generating the first, second, third and fourth, signals under simulated or test vehicle conditions such that the look-up table includes information relating to substantially all operating conditions likely to be experienced by an actual vehicle.

14. The method of claim 11, further comprising:

acquiring and interpreting the data associated with the first, second, third and fourth, signals prior to populating the multi-dimensional look-up table.

* * * * *